United States Patent
Budaker et al.

(10) Patent No.: US 7,364,005 B2
(45) Date of Patent: Apr. 29, 2008

(54) STEERING SYSTEM

(75) Inventors: Martin Budaker, Heubach (DE); Ralf Dangelmaier, Lichstrasse (DE); Michael Schmidt, Plüederhausen (DE); Helmut Knoedler, Lorch (DE); Jüergen Bieber, Schwäebisch Gmünd (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 0 days.

(21) Appl. No.: 11/438,724

(22) Filed: May 22, 2006

(65) Prior Publication Data

US 2006/0278465 A1 Dec. 14, 2006

Related U.S. Application Data

(63) Continuation of application No. PCT/EP2004/013923, filed on Dec. 8, 2004.

(30) Foreign Application Priority Data

Dec. 18, 2003 (DE) .................. 103 59 307

(51) Int. Cl.
*B62D 5/00* (2006.01)

(52) U.S. Cl. .............. 180/428; 180/444; 74/388 PS

(58) Field of Classification Search ............. 180/444, 180/426, 428; 74/388 PS, 409

See application file for complete search history.

(56) References Cited

U.S. PATENT DOCUMENTS

| | | | |
|---|---|---|---|
| 4,580,651 A | 4/1986 | Adams | |
| 4,724,714 A | 2/1988 | Iwasaki et al. | |
| 5,299,649 A | 4/1994 | Sano et al. | |
| 5,590,732 A | 1/1997 | Sugino et al. | |
| 6,547,030 B1* | 4/2003 | Nomura et al. | 180/441 |
| 6,550,567 B2* | 4/2003 | Murakami et al. | 180/444 |
| 6,561,306 B2* | 5/2003 | Watanabe et al. | 180/444 |
| 6,769,507 B2* | 8/2004 | Murakami et al. | 180/444 |
| 6,918,457 B2* | 7/2005 | Saruwatari et al. | 180/444 |
| 2005/0012417 A1 | 1/2005 | Fasterding et al. | |

FOREIGN PATENT DOCUMENTS

| | | |
|---|---|---|
| DE | 34 35 520 | 4/1985 |
| DE | 36 36 699 | 4/1987 |
| DE | 44 25 101 | 2/1995 |
| DE | 197 17 797 | 4/1997 |
| DE | 199 35 283 | 11/2000 |
| DE | 102 14 276 | 10/2003 |
| EP | 0 528 200 | 2/1993 |
| FR | 28 65 703 | 8/2005 |

* cited by examiner

*Primary Examiner*—Tony Winner
(74) *Attorney, Agent, or Firm*—Jordan and Hamburg LLP

(57) ABSTRACT

A steering system for a vehicle includes a shaft that is rotatably mounted on a frame in a bearing, the shaft being functionally linked with a steered wheel for adjusting the steering angle thereof, and a structure for axially positioning the shaft in the frame. In order to allow for the shaft of the steering system to be free of backlash in an inexpensive and simple manner, the structure for axially positioning the shaft is configured as a pressure pad which is axially supported on the frame and on the bearing sitting on the shaft without play and which retains the bearing on the frame.

16 Claims, 1 Drawing Sheet

STEERING SYSTEM

BACKGROUND OF THE INVENTION

The invention relates to a steering system for a vehicle, having a shaft which is mounted rotatably on a frame in a bearing.

Steering systems for vehicles have, inter alia, shaft parts in a frame or gear mechanism housing, which are configured as an output element, the rotation of which, caused by a rotational movement on a steering handle and/or by a rotational movement of a servomotor shaft, brings about a steering angle adjustment of a steerable wheel. Output elements of this type are configured as pinions or steering spindles for rack and pinion steering systems or recirculating ball steering systems and are frequently connected to an input shaft of the steering system in an approximately rotationally fixed manner via a rotationally elastic element.

The output element of a steering system of this type is to be mounted free of axial play, as it interacts, inter alia, with a sensor for detecting the rotational direction and torque magnitude in the input shaft.

DE 199 35 283 A1 describes a steering system which is configured as an electric power steering system, the output element being mounted in a locating bearing. For the purpose of axial fixing, the output element has a thread and a nut screwed thereon at its end. The nut supports the output element in an axially nondisplaceable manner on an inner ring of the locating bearing. The locating bearing can also be clamped in the radial direction with a clamping mechanism.

The known means for the axial positioning of the output element are suitable only to a limited extent for the positioning of the output element in the region of large diameters of the output element, and are comparatively complicated and expensive to configure.

SUMMARY OF THE INVENTION

The invention is based on the object of providing an inexpensive playfree mounting for shafts or output elements of a steering system.

As a result of the fact that the shaft is connected without play to the bearing and the bearing is held on the frame by a hold-down which is supported axially on the frame and the bearing, a method is provided to position the shaft without axial play, which method can be configured simply and inexpensively.

The bearing is preferably configured as a radial deep groove ball bearing and, in particular, as a rigid deep groove ball bearing, and the hold-down acts in the axial direction on the outer ring of the radial bearing. The outer ring of the radial bearing is pressed onto a bearing seat on the frame. For this purpose, the hold-down preferably acts on the entire circumference of the outer ring of the radial bearing and, in particular, with an annular section on the outer ring. Here, the hold-down can extend axially and radially in a sleeve-shaped or cylindrical manner over a sensor or a valve or the like on the shaft.

It can be expedient to configure the sleeve-shaped or cylindrical hold-down with sections of different inside width or different diameter, in order to extend over, for instance, a torque/rotational speed sensor. To this end, the hold-down can preferably be configured with a comparatively small diameter or inside width on the bearing and can have an approximately twice as large diameter or a twice as large inside width in the region of the sensor or valve.

The hold-down is preferably pressed against the bearing by an elastic means. The elastic means which generates a pretensioning force can be a region or a zone of increased elasticity in the hold-down. In one particularly preferred exemplary embodiment, the region of increased elasticity in the hold-down is arranged in a transition region between two different diameters or inside widths of the hold-down and is configured in the manner of a disk spring. The hold-down is supported radially in the gear mechanism housing in the frame which is formed as a gear mechanism housing of the steering system, and is simple to mount as a result. Here, the hold-down preferably comes to rest in a housing depression which is closed by a housing cover. In this way, one end of the hold-down is supported on the bearing and the other end is supported on the housing cover. The hold-down is preferably formed in one piece as a pressed part or a deep drawn part, cylindrically with approximately the same wall thickness or as a stepped cylinder. In order to reduce the installation space of the gear mechanism housing, the hold-down can have cutouts, into which parts of the sensor or of a valve or the like can protrude.

The shaft which is positioned without play by the hold-down can be configured as an output element in the form of a pinion of a rack and pinion steering system. It can be expedient to configure the output element as a threaded spindle of a recirculating ball steering system.

The steering system having the playfree mounting according to the invention of the shaft or of the output element can be an electric and/or hydraulic power steering system or external power steering system.

The invention will now be described in greater detail using an exemplary embodiment and using the appended drawing.

DESCRIPTION OF THE PREFERRED EMBODIMENTS

Figure 1:
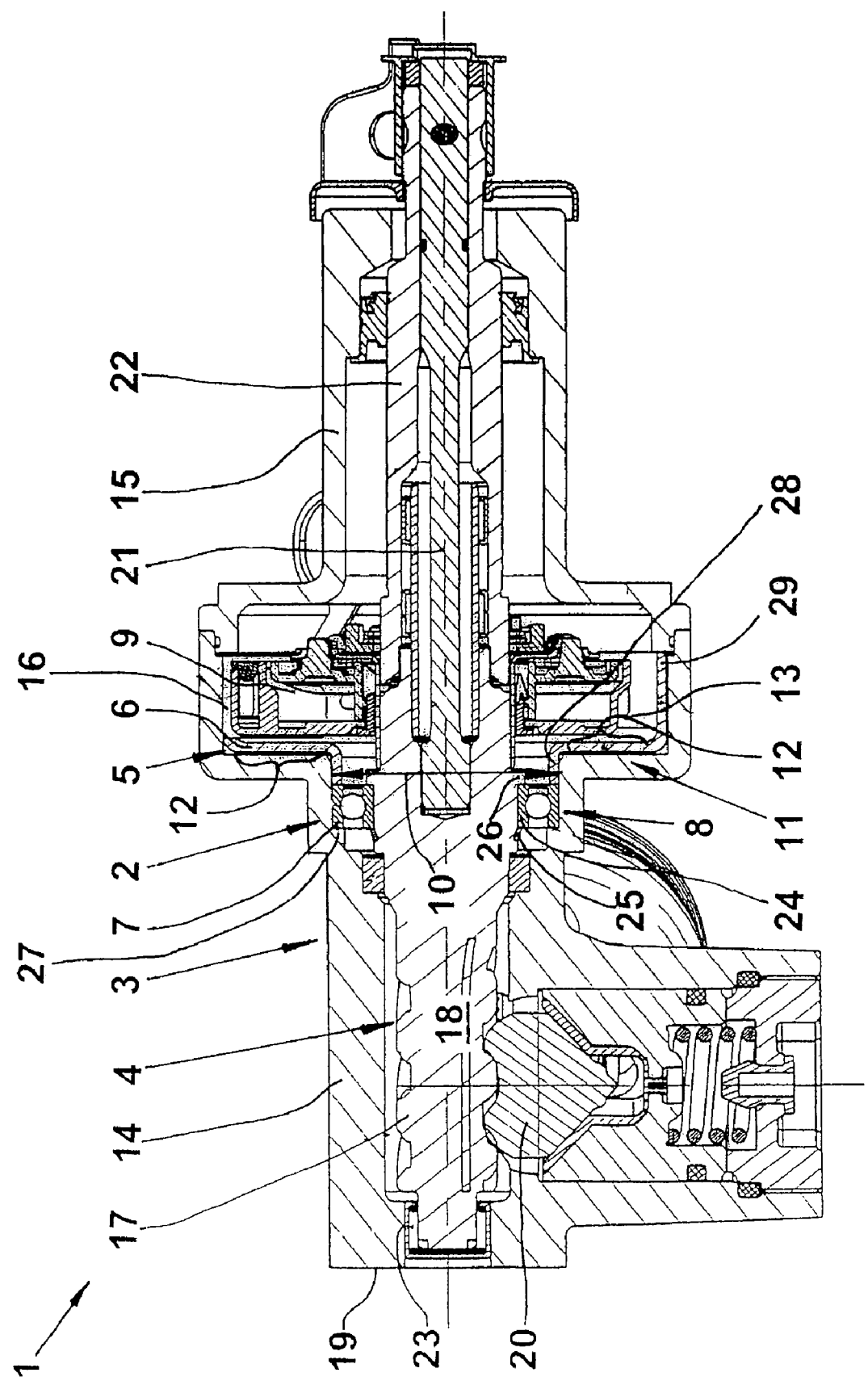
FIG. 1 shows a longitudinal section through a rack and pinion gear mechanism of an electric power steering system.

FIG. 1 shows a longitudinal section through a frame 3 which is configured as a gear mechanism housing 14 of a steering system 1 which is configured as a rack and pinion power steering system of a vehicle. A shaft 4 which is configured as an output element 18 of the rack and pinion power steering system is mounted rotatably in the gear mechanism housing 14.

The output element 18 is configured as a pinion 17 with helical toothing and meshes with a rack 20 at one end 19 of the gear mechanism housing 14. The rack 20 is operatively connected to one or more steerable wheels of the vehicle for adjusting the steering angle of the steerable wheels. The output element 18 is connected to an input shaft 22 of the rack and pinion power steering system via a rotationally elastic element 21. The torque of a steering handle is applied to, the input shaft 22.

The gear mechanism housing 14 is of substantially two-part configuration and is closed with a cylindrical housing cover 15 which widens towards the interface between the input shaft 22 and the output element 18. The input shaft 22 extends substantially into the housing cover 15.

A sensor 9 which measures the torque and the rotational direction of the input shaft 22 is arranged in a widened region of the gear mechanism housing 14. As viewed in the axial direction of the output element 18, a bearing 2 for the rotatable mounting of the output element 18 in the gear mechanism housing 14 is arranged between the sensor 9 and the toothed region of the output element 18. The bearing 2 is configured as a locating bearing and radial bearing 8. It is preferably a rigid deep groove ball bearing which is capable of supporting corresponding axial forces.

The output element 18 is mounted in a needle bearing 23 at the end 19 of the gear mechanism housing 14. The mounting of the output element 18 is realized simply and inexpensively in this way, as small bearing designs are selected.

In order to position the output element 18 in a playfree manner, in particular in the axial direction, an inner ring 24 of the radial bearing 8 is held against a collar 26 of the output element 18 with a crush ring 25. An outer ring 7 of the radial bearing 8 is pressed against an axial stop 27 on the gear mechanism housing 14 with a hold-down 6 which is provided as a means 5 for the axial positioning of the output element 18. As a result, the output element 18 is mounted in an axially playfree manner.

In the exemplary embodiment shown, the hold-down 6 is configured as a cylindrical, single-part component with an approximately uniform wall thickness. The hold-down 6 which can be formed from steel sheet has, at its annular section 28 with which it bears against the entire side face of the outer ring 7 of the radial bearing 8, a diameter 10 which is approximately half of its diameter in the region in which it extends over the sensor 9. The hold-down 6 is supported axially on the housing cover 15 with its section 29 which lies opposite the annular section 28.

In the exemplary embodiment shown, the hold-down 6 has a transition region 13 between different diameters of the hold-down 6. The transition region 13 is provided as an elastic means 11, in order for it to be possible to pretension the hold-down 6 axially. A region 12 of increased elasticity is provided in the transition region 13 in the hold-down 6 in the manner of a disk spring. The hold-down 6 is supported radially in the gear mechanism housing 14 with its entire outer circumferential surface and is simple to mount as a result. In order to minimize the installation space of the gear mechanism housing 14, the hold-down 6 has cutouts 16 at individual locations, into which cutouts 16 parts of the sensor 9 can protrude.

As a result of the selected dimensions of the hold-down 6, the housing cover 15 is arranged without a gap on the gear mechanism housing 14, and the radial bearing 8 is held on the gear mechanism housing 14 with a defined force.

LIST OF DESIGNATIONS

1 Steering system
2 Bearing
3 Frame
4 Shaft
5 Means for axial positioning
6 Hold-down
7 Outer ring
8 Radial bearing
9 Sensor
10 Diameter
11 Means, elastic
12 Region of increased elasticity
13 Transition region
14 Gear mechanism housing
15 Housing cover
16 Cutout
17 Pinion
18 Output element
19 End, of 14
20 Rack
21 Rotationally elastic element
22 Input shaft
23 Needle bearing
24 Inner ring, of 8
25 Crush ring
26 Collar, on 18
27 Axial stop
28 Section, annular, of 6
29 Section, of 6

The invention claimed is:

1. A steering system for a vehicle, having a shaft which is rotatably mounted on a frame in a bearing and is operatively connected to a steerable wheel for the adjustment of its steering angle, and having a means for the axial positioning of the shaft in the frame, the means for axial positioning is a hold-down which is supported axially on the frame and on the bearing and holds the bearing axially on the frame, the hold-down extending over a sensor of the steering system.

2. The steering system as claimed in claim 1, wherein the hold-down acts in the axial direction on an outer ring of the bearing which is configured as a radial bearing.

3. The steering system as claimed in claim 1, wherein the hold-down acts in the axial direction in a manner which is distributed over the circumference of the bearing.

4. The steering system as claimed in claim 1, wherein the hold-down is of substantially sleeve-shaped or cylindrical formation.

5. The steering system as claimed in claim 4, wherein the hold-down has different diameters.

6. The steering system as claimed in claim 1, wherein the hold-down has a smaller diameter or inside width on the bearing than in its region of the sensor.

7. The steering system as claimed in claim 1, wherein the hold-down is pressed against the bearing by an elastic means.

8. The steering system as claimed in claim 7, wherein the elastic means is a region of increased elasticity in the hold-down.

9. The steering system as claimed in claim 1, wherein the elastic means is arranged in a transition region between two different diameters or inside widths of the hold-down.

10. The steering system as claimed in claim 1, wherein the frame is configured as a gear mechanism housing of the steering system and the hold-down is in contact radially in the gear mechanism housing.

11. The steering system as claimed in claim 10, wherein the hold-down is supported on the housing cover of the gear mechanism housing.

12. The steering system as claimed in claim 1, wherein the hold-down is formed in one piece.

13. The steering system as claimed in claim 1, wherein the hold-down has a cutout.

14. The steering system as claimed in claim 1, wherein the shaft or the output element is a pinion of a rack and pinion steering system.

15. The steering system as claimed in claim 1, wherein the shaft or the output element is a threaded spindle of a ball and nut steering system.

16. The steering system as claimed in claim 1, wherein the steering system is a power steering system or external power steering system.

* * * * *